United States Patent [19]
Sinner et al.

[11] Patent Number: 5,632,507
[45] Date of Patent: May 27, 1997

[54] VEHICLE INTERIOR SUPPORT

[75] Inventors: Michael Sinner, Rottenburg; Bernhard Holzapfel, Remshalden; Friedrich Reiter, Sindelfingen, all of Germany

[73] Assignee: Mercedes-Benz AG, Stuttgart, Germany

[21] Appl. No.: 591,404

[22] Filed: Jan. 25, 1996

[30] Foreign Application Priority Data

Jan. 25, 1995 [DE] Germany .................. 195 02 226.2 U

[51] Int. Cl.$^6$ .................................................. B60R 21/04
[52] U.S. Cl. .......................... 280/751; 280/750; 280/752; 280/784
[58] Field of Search ........................... 280/752, 751, 280/750, 748, 784; 248/345.1

[56] References Cited

U.S. PATENT DOCUMENTS

| | | | |
|---|---|---|---|
| 4,978,136 | 12/1990 | Tomita et al. | 280/752 |
| 5,037,130 | 8/1991 | Okuyama | 280/752 |
| 5,273,314 | 12/1993 | Sakakibara . | |
| 5,482,319 | 1/1996 | Yoshimura et al. | 280/752 |

FOREIGN PATENT DOCUMENTS

| | | | |
|---|---|---|---|
| 962295 | 2/1975 | Canada | 280/784 |
| 2061595 | 7/1972 | Germany . | |
| 2332420 | 1/1974 | Germany . | |
| 4003952A1 | 8/1991 | Germany . | |
| 4105027C1 | 4/1992 | Germany . | |
| 6-183306 | 12/1982 | Japan . | |
| 1436175 | 5/1976 | United Kingdom | 280/748 |

*Primary Examiner*—Eric D. Culbreth
*Attorney, Agent, or Firm*—Evenson, McKeown, Edwards & Lenahan, P.L.L.C.

[57] ABSTRACT

A flexible support has one fixed end in a vehicle interior, and another end projecting freely into the passenger compartment on which an impact protector is fixed. In a flexing direction, the flexible support has spaced upper and lower belts, which are connected with each other by ribs to form hollow spaces. One belt extends along a straight line and the other belt is configured with protrusions and/or depressions between adjacent ribs in the direction toward the straight belt.

9 Claims, 2 Drawing Sheets

VEHICLE INTERIOR SUPPORT

BACKGROUND AND SUMMARY OF THE INVENTION

The present invention relates to a vehicle interior flexible support with one end fixed on the vehicle and another end projecting freely into the passenger compartment upon which an impact protector is fixed in place. In the direction of flexure, the flexible support has an upper belt and a lower belt, spaced from each other and connected with each other by ribs forming hollow spaces.

A knee protector in a vehicle interior is described in U.S. Pat. No. 5,273,314, and which comprises an impact protector fastened on a flexible support. The flexible support has an upper and a lower belt which are bent over their length and are connected by ribs to enclose hollow spaces. So that the flexible support can be bent sufficiently far when a rider impacts on the impact protector, the belts already have a flexing line pointing in a predetermined flexing direction, and the flexible support is disposed at an angle which deviates from the horizontal, by way of which a flexing direction is also predetermined. The known triangular-shaped rib arrangement does not offer sufficient resilience. A flexible support of this configuration predetermines the displacement distance of the impact plate required to reduce the stress on the passenger in case of an impact.

Deformation elements are described in DE 40 03 952 A1, on which is fixed a sheet metal dish which is used as a knee protector. The deformation elements are formed by hexagonal pipe sections fastened on each other which can be bent together under load corresponding to the direction of the load, but which cannot predetermine a defined direction in the course thereof. By themselves, these deformation elements cannot direct the sheet metal dish into a predetermined direction, for which reason the sheet metal dish is additionally hinged and can only be pivoted around this pivot point. It is not possible to obtain an effect, as with a flexible support, on the direction of displacement of the knee protector.

In connection with the general theme of a flexible support which gives in case of an impact, reference is also made to U.S. Pat. No. 4,978,136; DE 2 061 595 A1; DE 2 332 420 A1; DE 41 05 027 C1; and DE 38 03 643 C2.

It is the object of the invention to improve the directed resilience of a flexible support during stress.

This object has been achieved in accordance with the present invention by providing that one of the upper and lower belts extends along a straight line, and the other of the upper and lower belts has at least one of protrusions and depressions between adjacent ones of the connecting ribs in a direction toward the one belt.

The flexible support, whose one end is fixed on the vehicle and on whose end projecting freely into the passenger compartment an impact protector is fixed in place, makes it possible to guide the impact protector on a displacement path so it recedes under a load because of an impact, degrades the impact energy in the course of this recession and prevents injuries. For this purpose, an upper belt and a lower belt spaced at a distance from each other are provided in the bending or flexure direction and are connected by ribs forming hollow spaces. To allow sufficient bending of the flexible support in the predetermined direction while maintaining good guidance properties, one belt extends with a higher bending resistance along a straight line, while the belt on the inside, which must be bent more while under a load and being bent, is provided between adjoining ribs with protrusions and/or depressions which have been formed thereon or therein, and in the process already has a preplanned or preselected bending.

Thus the flexible support is only easily bendable in a desired direction while, however, an energy degradation can take place over the entire length of the flexible support. It is now possible with the present invention to increase bending resistance by selecting the bending cross sections of the protrusions or depressions, as well as those of the ribs, for example by formed-on ribs, and changing wall thicknesses or beads, so that the bending resistance of the flexible support increases from the impact protector in the direction toward the fastening of the flexible support.

The impact protector of the present invention can comprise a support element for connection with a flexible support, which has a greater bending resistance than the flexible support, and which is covered by an impact-dampening deformation element. Consequently, the energy degradation at the impact protector during an impact takes place in two stages, i.e. first only in the deformation element and second, with increased force effect, in the flexible support.

A belt extending along a straight line, which in addition is disposed approximately horizontally in the vehicle interior, is suitable for seating a storage compartment, which can be inserted in a receptacle formed by the impact protector and the lateral flexible supports and is held thereon. The horizontal orientation made possible by the configuration of the flexible support furthermore has the advantage that the flexible support takes up little height in the interior space, so that structural or movement space for the passenger is maintained by way thereof.

The flexible support fastening in the vehicle has a particularly good effect if the flexible support is supported on a transverse support of the vehicle so that under load it acts on the transverse support with a countermoment to the torsional moment generated by the stress on the steering column, which acts at the same time on the transverse support, so that it is possible to reduce the rising movement of the steering column.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
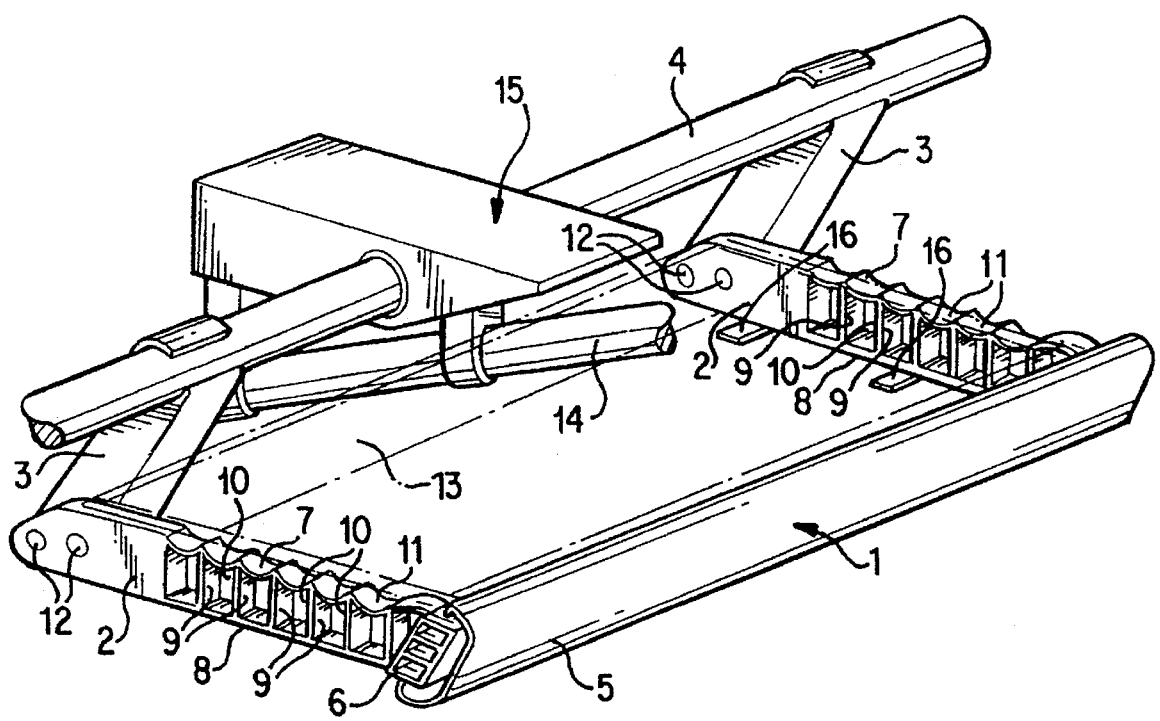
FIG. 1 is a perspective view of an impact protector on flexible supports arranged on both sides of a vehicle interior on a transverse vehicle support, with a storage compartment shown in dashed lines insertable between the flexible supports and the impact protector.

FIG. 1 represents a section of a vehicle interior, in which an elongated impact protector 1 is fixed on both sides thereof, via a flexible support 2 and adjoining connecting supports 3 on a transverse vehicle support 4. The impact protector 1 protects passengers against injuries caused by impacting against the vehicle in case of an accident in that its surface is formed by an impact-dampening resiliently seated deformation element 5. The element 5 is fastened on a support element 6 formed as an extruded aluminum section which, in turn, is connected with the lateral flexible supports 2.

Figure 2:
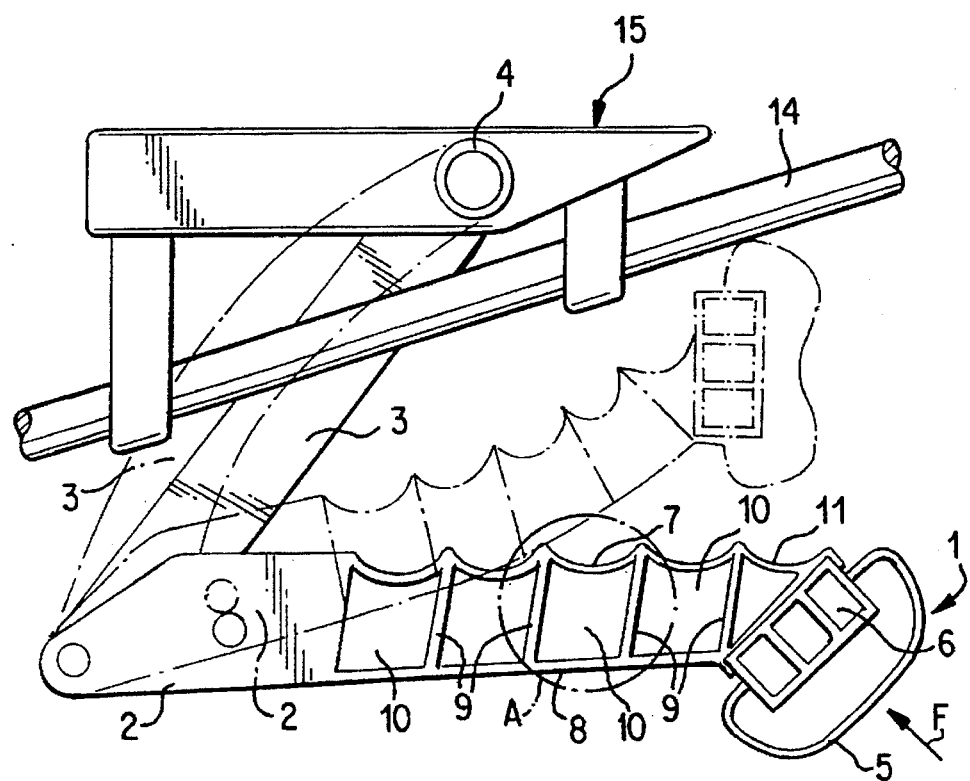
FIG. 2 is a side view of the impact protector of FIG. 1 on the flexible support in which the flexible support is also shown in dash-dotted lines following an impact load on the impact protector.

The lateral supports 2 are purposely designed to be flexible and, when a force is transmitted to the impact protector 1, the supports 2 guide the impact protector 1 obliquely upward along a predetermined flexing line because of their bending, as shown in dash-dotted lines in FIG. 2. Each flexible support 2 comprises an upper belt 7 located on the top in the bending or flexure direction and a lower belt 8 at a distance therefrom, with the belts 7, 8 being connected by ribs 9 and forming hollow spaces 10. The lower belt 8 extends approximately horizontally along a straight line, while the upper belt 7 can take various shapes forming depressions 11 between adjoining ribs 9.

The arrangement of the impact protector 1 is intended to protect the knees of a passenger from excessive loads during an impact. For this reason it is possible, when a force acts on the impact protector 1 in the direction of the arrow F shown in FIG. 2, to purposefully push the impact protector 1 on a curved displacement line upwards with a defined resistance, and away from the passenger. Because the support element 6 has a higher bending resistance than the flexible support 2, the energy degradation takes place in two stages, namely initially only in the yielding deformation element 5, and then under higher loads bending of the flexible supports 2 in a predetermined direction begins.

Figure 3A:
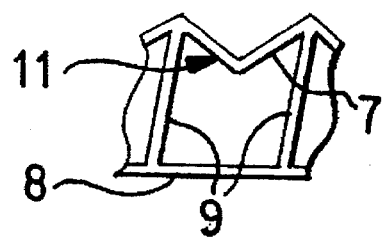
FIGS. 3a, 3b, 3c show different embodiments of the section in FIG. 2 within a dash-dotted circle, A in the form of protrusions or depressions in a belt of the flexible support.
Figure 3B:
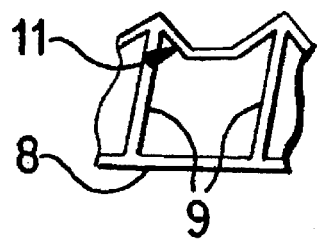
Figure 3C:
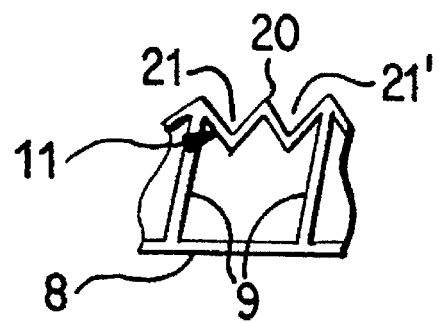

Because of the straight lower belt 8 and in respect to it, the flexible support 2 has a considerably higher bending resistance in the opposite bending direction i.e. opposite to the direction shown in phantom lines in FIG. 2. The depression 11 in the shape of a bulgy arch of the upper belt 7 between pairs of ribs 9 permits bending with a lesser bending resistance, wherein impact energy is degraded because of the bending capability between the ribs over almost the entire length of the flexible support 2. The connecting support 3, which is fixed with one end on the transverse support 4, is also used to degrade energy by bending thereof as shown by the dot dash line in FIG. 2. Corresponding to the section indicated as a circle A represented by dash-dotted lines in FIG. 2, FIGS. 3a, 3b and 3c illustrate further examples of a configuration of the flexible support 2. For example, FIG. 3c shows a protrusion 20 between alternating depressions 21, 21'.

The bending cross sections of the depressions 11 as well as those of the ribs 9 are varied in their bending cross sections so that their bending resistance increases from the impact protector 1 in the direction of the flexible support fastening 12 on the connecting support 3. Thus, the resistance against further bending increases.

A receptacle is delimited by the support element 6 of the impact protector 1 and the lateral flexible supports 2, into which a deformable storage compartment 13 (shown in dashed lines in FIG. 1) can be inserted. The compartment 13 is held by support projections 16 on the approximately horizontal and straight lower belt 8 of both flexible supports 2. In addition to the fact that because of their straight and horizontal extension the flexible supports 2 occupy little structural height, they are here additionally used as supports for the storage compartment 13.

A steering column 14 is held via a receptacle 15 on the transverse support 4, on the right end of which in FIG. 2 a steering wheel (not shown) is arranged in a known manner to extend into the vehicle interior. The fastening of the flexible support 2 on the transverse vehicle support 4 via the connecting support 3 is selected to be such, that when the flexible support 2 is bent, it acts on the transverse support 4 with a counter moment (in a clockwise direction as viewed in FIG. 2) in relation to the torsional moment (in the counterclockwise direction as viewed in FIG. 2) by the steering column 14 which was also stressed by the impact, and in this way can reduce the lifting movement of the steering column 14.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A support adapted to be arranged in a vehicle interior, comprising at least one support member having one end configured to be fixed on the vehicle interior and another end projecting freely into a passenger compartment of the vehicle interior, the free projecting end being fixed to an impact protector and an upper belt and a lower belt extending in a predetermined flexure direction and spaced from each other with connecting ribs defining hollow spaces therebetween, wherein one of the upper and lower belts extends along a straight line, and the other of the upper and lower belts has at least one of protrusions and depressions between adjacent ones of the connecting ribs in a direction toward the one belt.

2. The support according to claim 1, wherein the at least one of the protrusions and depressions have bending cross sections with bending resistance which is sized to increase from the impact protector toward a fastening at the one end of the at least one support member.

3. The support according to claim 1, wherein the connecting ribs are configured to have a bending resistance which increases in a direction toward a fastening on the one end of the at least one support member.

4. The support according to claim 1, wherein the impact protector comprises a support element for fastening to the at least one support member and is configured to have a higher bending resistance than the at least one support member, and is covered by an impact-dampening deformation element.

5. The support according to claim 4, wherein the at least one support member comprises two support members provided at each end of the support element.

6. The support according to claim 4, wherein the support is supported on a transverse support so that when the support is subjected to a load, the transverse support is acted upon with a counter-moment in relation to a torsional moment due to a steering column load acting simultaneously on the transverse support.

7. The support according to claim 1, wherein the belt extending along a straight line is arranged substantially horizontally in the vehicle interior.

8. The support according to claim 7, wherein the impact protector and the support member are configured for receiving an insertable storage compartment.

9. The support according to claim 1, wherein the impact protector is configured as a knee protector.

* * * * *